United States Patent
Toide et al.

[11] Patent Number: 5,210,627
[45] Date of Patent: May 11, 1993

[54] OPTICAL RECORD AND REPRODUCTION APPARATUS WITH LIQUID CRYSTAL PANEL THAT ROTATES LIGHT FOLLOWED BY A POLARIZER OR BIREFRINGENT PLATE

[75] Inventors: Eiichi Toide; Toru Yoshihara, both of Nagaokakyo, Japan

[73] Assignee: Mitsubishi Denki Kabushiki Kaisha, Tokyo, Japan

[21] Appl. No.: 707,909

[22] Filed: May 30, 1991

[30] Foreign Application Priority Data

May 31, 1990 [JP] Japan .................. 2-144847
Jun. 22, 1990 [JP] Japan .................. 2-164623
Mar. 13, 1991 [JP] Japan .................. 3-48010

[51] Int. Cl.$^5$ .................. G02F 1/1335; G11B 7/00
[52] U.S. Cl. .................. 359/40; 369/44.12; 369/44.14; 369/109; 369/110
[58] Field of Search .......... 359/40; 369/44.12, 44.14, 369/109, 110

[56] References Cited

U.S. PATENT DOCUMENTS

| | | | |
|---|---|---|---|
| 4,389,096 | 6/1983 | Hori et al. .................. | 359/41 |
| 4,733,065 | 3/1988 | Hoshi et al. ................ | 369/44.14 |
| 4,767,194 | 8/1988 | Heppke et al. .............. | 359/48 |
| 4,935,913 | 6/1990 | Shinoda ...................... | 369/54 |
| 4,983,002 | 1/1991 | Shikama et al. ............ | 369/44.11 |
| 4,991,160 | 2/1991 | Premji ........................ | 369/44.12 |
| 4,991,919 | 2/1991 | Nishiwaki et al. .......... | 385/14 |
| 5,062,098 | 10/1991 | Hori et al. .................. | 369/44.12 |

FOREIGN PATENT DOCUMENTS

| | | |
|---|---|---|
| 0241372 | 10/1987 | European Pat. Off. . |
| WO87-006386 | 10/1987 | France . |
| 2613866 | 10/1988 | France . |
| 0052342 | 3/1988 | Japan .................. 369/44.12 |
| 0241735 | 10/1988 | Japan .................. 369/44.12 |
| 1013238 | 1/1989 | Japan . |
| 1076028 | 3/1989 | Japan . |

*Primary Examiner*—William L. Sikes
*Assistant Examiner*—Anita Pellman Gross

[57] ABSTRACT

An optical record and reproduction apparatus, in which a light beam generated by a light source is concentrated onto an information recording medium by a focusing device, and the light beam reflected by the information recording medium is detected by a light detector to obtain a tracking error signal. A liquid crystal panel having a transparent electrode aligned in a striped form and a polarizing plate or birefringent phase difference plate constitute a beam divider for obtaining a main beam and supplementary beams without any accompanying mechanical movement. The beam divider is arranged between the light source and the focusing device. By selectively applying a voltage to the transparent electrode, the liquid crystal panel is made to function in the same manner as a diffraction grating. Another transparent electrode aligned in a striped form at an inclined angle may also be provided.

11 Claims, 13 Drawing Sheets

FIG. 12
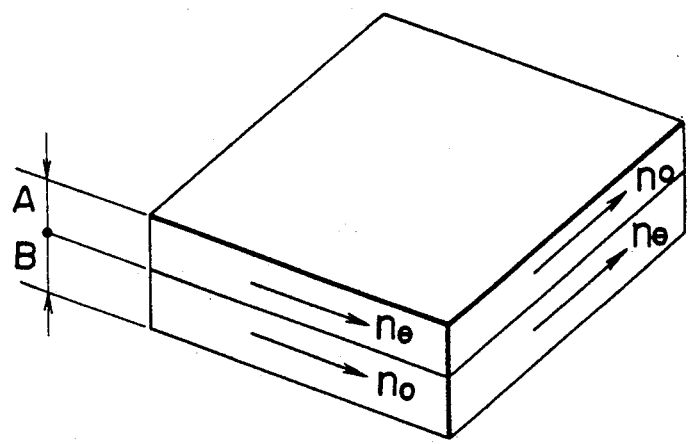
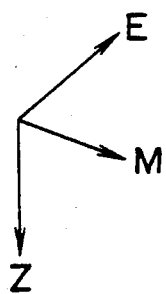

OPTICAL RECORD AND REPRODUCTION APPARATUS WITH LIQUID CRYSTAL PANEL THAT ROTATES LIGHT FOLLOWED BY A POLARIZER OR BIREFRINGENT PLATE

BACKGROUND OF THE INVENTION

1. Field of the Invention

The present invention relates to an optical record and reproduction apparatus for detecting a tracking error signal, and more particularly to an optical record and reproduction apparatus having excellent economical efficiency and reliability.

2. Description of the Background Art

In a conventional optical record and reproduction apparatus, signals are recorded or reproduced in a spiral or concentric circular form to or from an information recording medium in a non-contact manner, and thus a tracking servo sensor system is required. Concerning the tracking servo sensor system, various systems have been proposed, for instance, a push-pull method utilizing a diffraction light beam reflected by a signal pit or guide groove formed on the information recording medium, or a three beam method using two supplementary beams.

In the former push-pull method, a diffraction light distribution formed by a guide groove of the information recording medium is projected to a dividing light detector to obtain a tracking error signal from its differential output. In the latter three beam method, the light beam is divided into a plurality of light beams by using a beam divider means such as a diffraction grating or the like, and a tracking error signal is obtained from a differential output of two supplementary beams positioned on both sides of a main beam for use in recording and reproducing.

These two methods are well-known, but there exist the following problems.

In the push-pull method, since a guide groove is used, influence of the guide groove depth is given. FIG. 1 shows the relationship between a push-pull signal and a guide groove depth in the push-pull method. As is apparent from FIG. 1, the push-pull signal value is the maximum or the minimum when the groove depth is $\lambda/8$ or $\lambda/4$, respectively. Accordingly, it is a disadvantageous system for a CD (compact disk) having a pit depth of approximately $\lambda/4$.

Meanwhile, in the three beam method, since the supplementary beams are used for recording signals onto a W/O (write once) disk having a groove depth of approximately $\lambda/8$, the recording signal is disrupted by the supplementary beams or an offset is caused.

FIGS. 2A and 2B show a conventional information recording medium having a recording track or a guide groove 17 and land portions 18, on which a main light beam 19 and first and second supplementary light beams 20a and 20b are focused, and the guide groove 17 includes record portions 21 recorded by the main beam 19. As shown in FIGS. 2A and 2B, the main beam 19 is tracked on the guide groove 17. In the case of FIG. 2B, the first and second supplementary beams 20a and 20b are both focused on the recording portions 21, and the same signal is picked up from the first and second supplementary beams 20a and 20b. Hence, a differential output of the supplementary beams 20a and 20b is zero, and no offset is caused. On the other hand, in the case of FIG. 2A, the first supplementary beam 20a is not focused on the recording portion 21 but the second supplementary beam 20b is focused on the recording portions. Hence, the outputs of the first and second supplementary beams 20a and 20b are different from each other, and an offset is caused.

As described above, both the conventional methods involve problems. In a conventional optical head device for recording and reproducing the signals onto and from the information recording medium such as the CD and the W/O disk, both tracking servo systems are switched depending on the kinds of the disks, and it is necessary to mechanically insert or remove the beam divider means such as the diffraction grating into or out of the light beam path.

In FIG. 3, there is shown an optical system of a conventional optical head device. A light beam generated by a semiconductor laser 1 is focused onto an information recording medium 6 through a diffraction grating 2, a collimator lens 3, a beam splitter 4 and an objective lens 5. The light beam reflected by the information recording medium 6 is then concentrated into a light detector 8 through the objective lens 5, the beam splitter 4 and a condenser lens 7.

The operation of this optical system will now be described. The diffraction grating 2 is arranged to be movable into or out of the path of the light beam generated by the semiconductor laser 1. Hence, when the signal is recorded onto the W/O disk, the diffraction grating 2 is retracted from the light path, and the tracking error signal is obtained by the push-pull method. On the other hand, when the signal stored in the W/O disk or CD is read out and reproduced, the diffraction grating 2 is moved into the light path, and the tracking error signal is obtained by the three beam method. That is, by moving the diffraction grating 2 into or out of the path of the light beam generated by the semiconductor laser 1, an optimum tracking error signal is obtained in a tracking servo sensor system. In this case, the tracking error signal is obtained by the push-pull method using one beam for the W/O disk or by the three beam method for the CD.

In FIG. 4, there is shown another conventional optical record and reproduction apparatus for obtaining a tracking error signal by a push-pull method using three beams and by using the three beam method in both the recording and reproducing operations. A semiconductor laser 1 projects a laser light beam B to an information recording medium 6 such as an optical disk via a collimator lens 3, a diffraction grating 2 for dividing the parallel light beam passed through the collimator lens 3 into a zero-order light (first beam B1) and ± primary lights (second and third beams B2 and B3), a polarization beam splitter 4 for passing the first to third light beams, a reflector mirror 19, a ¼ wavelength plate 22 and an objective lens 5. A driver circuit 21 drives the semiconductor laser 1 as hereinafter described in detail. The reflector mirror 19, the ¼ wavelength plate 22 and the objective lens 5 are arranged between the polarization beam splitter 4 and the information recording medium 6. The diffraction grating 2 may be positioned between the semiconductor laser 1 and the collimator lens 3.

The information recording medium 6 is provided with an information track or tracks T extending in the turning direction of the information recording medium 6, as indicated by an arrow in FIG. 5 or FIG. 6. On the information track T, the first to third beams B1 to B3 are irradiated, and, in particular, a plurality of pits P are recorded or reproduced by a first light spot S1 formed by the first beam B1 positioned between the second and third beams B2 and B3. Hence, the first spot S1 of the first beam B1 is always positioned in the central position of the information track T. On the other hand, on reproducing, as shown in FIG. 5, since the second and third beams B2 and B3 respectively precede and follow the first beam B1, they contribute as the supplementary beams to the production of the tracking error signal, and thus second and third light spots S2 and S3 formed by the respective second and third beams B2 and B3 are placed in positions shifted from the central position of the information track T. On recording, as shown in FIG. 6, since the second and third beams monitor the situation of the information track T, the second and third light spots S2 and S3 are positioned in the central position of the information track T. In the recording, the intensity of the first beam B1 is strong, and, since the second and third beams B2 and B3 only contribute to the monitoring of the state of the information track T, the intensity of the second and third beams B2 and B3 is controlled so as to be sufficiently weak.

A slant mechanism 20 is provided for the diffraction grating 2 for slanting the diffraction grating 2 a certain minute angle $\theta$ through a drive mechanism (not shown) in response to a switching signal C fed to the slant mechanism 20 from a signal switch circuit 13 so as to switch the directions of the first to third beams B1, B2 and B3. That is, the slant mechanism 20 constitutes a light spot switch means for switching positions of second and third spots S2 and S3 on an information track T of the information recording medium 6 depending on whether a recording or a reproducing operation is being carried out.

In this instance, the semiconductor laser 1, the diffraction grating 2, the collimator lens 3, the polarization beam splitter 4, the objective lens 5, the reflector mirror 19 and the slant mechanism 20 constitute a beam irradiation device for irradiating the first to third beams on the information track T of the information recording medium 6.

A group of sensor lenses 7 and 10 such as convex and cylindrical lenses, respectively, concentrate the first to third beams B1, B2 and B3 reflected by the polarization beam splitter 4 to a light detector 8 having six divided sensing surfaces 8a to 8f, as shown in FIG. 7, (four central surfaces 8a to 8d for receiving the first light spot S1' formed by the reflected first beam B1 and two side surfaces 8e and 8f for receiving the second and third spots S2' and S3' formed by the reflected second and third beams B2 and B3) so as to detect the first to third beams independently.

In FIG. 4, a signal Dad has a luminous energy corresponding to the sum of signals Da and Dd having respective luminous energy, output from the sensing surfaces 8a and 8d of the light detector 8, and a signal Dbc has a luminous energy corresponding to the sum of signals Db and Dc having respective luminous energy, output from the sensing surfaces 8b and 8c of the light detector 8. A signal De has a luminous energy corresponding to the intensity of the reflected second light beam B2, output from the sensing surface 8e of the light detector 8, and a signal Df has a luminous energy corresponding to the intensity of the reflected third light beam B3, output from the sensing surface 8f of the light detector 8.

The signal switch circuit 13 controls a link switch 12 and outputs a control signal thereto in order to switch the detecting systems for obtaining a tracking error signal E. The signal switch circuit 13 also outputs the switching signal C to the slant mechanism 20, as described above. In response to the control signal sent from the signal switch circuit 13, the link switch 12 selects one of pairs of signals Dad and De or signals Dbc and Df at the same time to output the selected signals to input terminals of a differential amplifier 14, and the differential amplifier 14 outputs the tracking error signal E to a tracking error signal detector 15 depending on the difference between the two signals selected by the link switch 12. A prerecord monitor 16 receives the signal De and detects a prerecord state of the information track T according to the signal De, and a postrecord monitor receives the signal Df and detects a postrecord state of the information track T according to the signal Df. A record and reproduction control unit 18 receives output signals fed from the prerecord and postrecord monitors 16 and 17 and detects information from the signals such as recording states, sector numbers and so forth.

The operation of the conventional record and reproduction apparatus will now be described in detail with reference to FIGS. 4 to 7.

First, when the information stored in the information recording medium 6 is reproduced, the light beam B emitted by the semiconductor laser 1 is formed into the parallel light beam by the collimator lens 3, and then the parallel light beam is passed through the diffraction grating 2 where it is divided into the zero-order first beam B1 projecting in the same direction as the incident parallel light beam and the ± primary second and third light beams B2 and B3 projecting in a somewhat deflected manner with respect to the incident parallel light beam. Then, the first to third light beams B1 to B3 are irradiated onto the information recording medium 6 via the polarization beam splitter 4, the reflector mirror 19, the $\frac{1}{4}$ wavelength plate 22 and the objective lens 5 to form the first to third light spots S1 to S3 on the information track T of the information recording medium 6, as shown in FIG. 5.

In this instance, the light intensities of the beams B1 to B3 are not modulated and thus are fixed output values. The light intensity ratio of the first beam B1 to the second or third beam B2 or B3 is predetermined by the designing of the diffraction grating 2. Also, the first light spot S1 of the first light beam B1 is irradiated in the central position of the information track T while the second and third light spots S2 and S3 of the second and third light beams B2 and B3 functioning as the supplementary beams for detecting the tracking error signal E are irradiated out of the central position of the information track T.

Then, the light beams B1 to B3 reflected by the information recording medium 6 are passed again through the objective lens 5 and the $\frac{1}{4}$ wavelength plate 22 to reach the polarization beam splitter 4. Since the polarization direction of the light beams B1 to B3 is rotated 90 degree when the light beams B1 to B3 pass twice through the $\frac{1}{4}$ wavelength plate 22, the returned light beams B1 to B3 are reflected by the polarization beam splitter 4 in a perpendicular direction to the original light beam. The light beams B1 to B3 reflected by the polarization beam splitter 4 are concentrated onto the light detector 8 via the sensor lenses 7 and 10 to form the first to third light spots S1' to S3' on the six divided sensor surfaces 8a to 8f of the light detector 8, as shown in FIG. 7.

In this case, since the first light spot S1' of the first beam B1 includes the recording information of the pits formed on the information track T of the information recording medium 6, the reproduction signals can be obtained by calculating the sum of the signals Da to Dd output from the sensor surfaces 8a to 8d on which the first light spot S1' is projected, in a conventional manner.

The signals Da to Df having the luminous energy detected on the sensor surfaces 8a to 8f of the light detector 8 are used for the calculation on the basis of a conventional signal detecting method, and then a focusing error signal and a tracking error signal are obtained by the astigmatic method and the three beam method, respectively.

In the reproducing operation, the link switch 12 is turned from the position shown in FIG. 4 to the other position by the signal switch circuit 13, and the signals De and Df output from the sensor surfaces 8e and 8f of the light detector 8 are selected. Hence, the tracking error signal output by the differential amplifier 14 is represented by the difference between the signals De and Df as follows.

$$E = De - Df$$

The obtained tracking error signal E is input to the tracking error signal detector 15 which discriminates whether or not the tracking error signal is correct. The signals De and Df are fed to the prerecord and postrecord monitors, respectively, but the monitorings are not carried out in the reproducing operation described above.

On the other hand, when the information is recorded on the information recording medium 6, the driver circuit 21 performs a pulse drive of the semiconductor laser 1 in accordance with the recording information to emit the light beam B including the recording information, for example, the information corresponding to the pulse width. The light beam B is then divided into three light beams B1, B2 and B3 and the three beams B1 to B3 are focused in the form of the light spots S1 to S3 onto the information track T of the information recording medium 6 in the same manner as the reproducing operation. In this case, the signal switch circuit 13 sends the switching signal C to the slant mechanism 20 in order to control it and rotates the diffraction grating 2 to a certain angle θ so that the second and third light spots S2 and S3 may be placed in the central position of the information track T of the information recording medium 6, as shown in Fig. 6.

As this time, the intensity of the first light beams B1 for recording is determined as strong, and the intensity of the second and third light beams B2 and B3 is determined as being sufficiently weak as compared with that of the first light beam B1 so as not to affect the recording.

The first light spot S1 successively forms the pits having shapes corresponding to the recording information on the information track T of the information recording medium 6 and is reflected thereby at the same time. The second light spot S2 preceding the first light spot S1 is reflected by the information track T on which no pit is recorded, and the third light spot S3 following the first light spot S1 is reflected by the information track T on which the pits are recorded.

Then, the first to third light beams B1 to B3 reflected by the information recording medium 6 are projected onto the light detector 8 in the form of the first to third light spots S1' to S3' in the same manner as the reproducing operation described above. In this instance, the tracking error signal is obtained by using the push-pull method. At this time, the link switch 12 is selected to the position shown in FIG. 4 by the signal switch circuit 13 to select the signals Dad and Dbc. Hence, the tracking error signal E is obtained as follows.

$$E = (Da + Dd) - (Db + Dc) = Dad - Dbc$$

In this case, the second and third beams B2 and B3 are not used for the detection of the tracking error signal E, and the signals De and Df are input to the prerecord and postrecord monitors 16 and 17, respectively, for use in detecting the state of the information track T before and after the recording of the information thereon. That is, by using the reflected second light beam B2, it is checked whether or not there is a defect on the information track T before the recording, and by using the reflected third light beam B3, a check is carried out whether or not the pits have been correctly recorded on the information track T after the recording.

Thus the obtained monitoring signals output from the prerecord and postrecord monitors 16 and 17 are fed to the record and reproduction control unit 18 where, when it is discriminated that there is a defect, processing such as another recording or the like is conducted to improve the recording error rate on the information recording medium 6.

As described above, in the conventional optical record and reproduction apparatuses, by moving the beam divider means such as the diffraction grating into or out of the light beam path or rotating the diffraction grating at a certain angle within the light beam path to change the direction of the light spots, the tracking error signal is obtained by using the push-pull method or the three beam method. Hence, in the conventional optical record and reproduction apparatuses, it is required to mechanically move or rotate the diffraction grating, and, since the position of the light beam with reference to the central position of the information track is required with an accuracy of a submicron order, problems arise. For example, the driving mechanism for the diffraction grating is complicated, and the responsive ability is bad. Further, the cost of the driving mechanism increases. Also, when the determined angle of the diffraction grating is shifted from the designed value, the amplitude of the monitor signal or the tracking error signal is reduced.

SUMMARY OF THE INVENTION

Accordingly, it is an object of the present invention to provide an optical record and reproduction apparatus in view of the problems of the prior art, which is capable of selecting one of a push-pull method and a three beam method by switching while a beam divider means is fixed.

In order to accomplish the object of the present invention, in accordance with one aspect of the present invention, there is provided an optical record and reproduction apparatus, comprising a light source means for generating a light beam, means for concentrating the light beam onto an information recording medium, a light detector means for receiving the light beam reflected by the information recording medium to obtain a tracking error signal, a liquid crystal panel means arranged between the light source means and the concentrating means, the liquid crystal panel means including a first transparent electrode having a striped form, a polarizing plate means arranged between the liquid crystal panel means and the concentrating means, and a voltage application means for selectively applying a voltage to the first transparent electrode.

In the optical record and reproduction apparatus, the liquid crystal panel means and the polarizing plate means constitute the beam divider means. When no voltage is applied to the first transparent electrode, the light beam is rotated a predetermined angle when passing through the liquid crystal panel means and can then pass through the polarizing plate means.

On the other hand, when the voltage is selectively applied to the first transparent electrode, the molecular arrangement of the liquid crystal is changed, and the light beam passing through the first transparent electrode is not rotated when passing through the liquid crystal panel means and is then stopped by the polarizing plate means.

Accordingly, the first transparent electrode and the polarizing plate means functions in the same manner as a diffraction grating.

Further, when the voltage is selectively applied to the first transparent electrode, the polarizing direction of the light beam is alternately varied, and a birefringent phase difference plate means can be used in place of the polarizing plate means to produce a phase difference depending on the polarizing direction of the light beam to effect a diffraction operation.

A second transparent electrode having a striped form can be arranged opposite to the first transparent electrode at a predetermined angle within the liquid crystal panel means, and the voltage is selectively applied to the second transparent electrode to carry out beam dividing to obtain supplementary beams to the concentrated on the information recording medium at a predetermined angle with respect to an information track.

BRIEF DESCRIPTION OF THE DRAWINGS

The above and other objects, features and advantages of the present invention will more fully appear from the following description of the preferred embodiments with reference to the accompanying drawings, in which:

FIG. 12 is a perspective view of phase difference plates of a third embodiment of a beam divider means of an optical record and reproduction apparatus according to the present invention;

DESCRIPTION OF THE PREFERRED EMBODIMENTS

Figure 1:
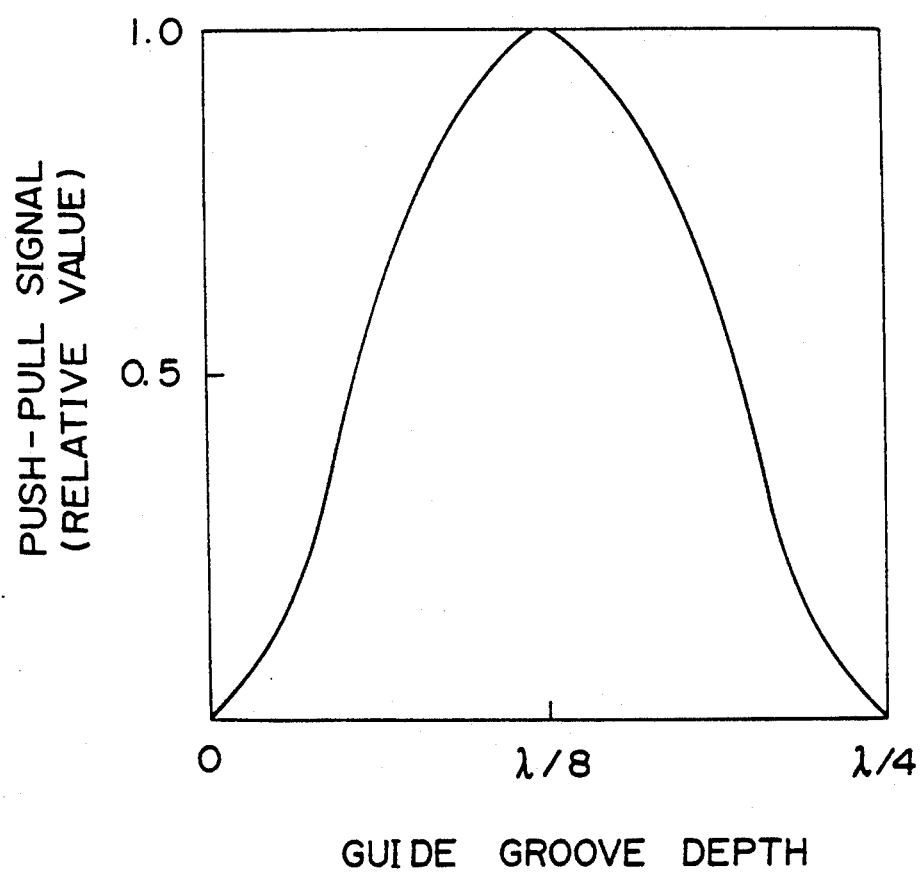
FIG. 1 is a graphical representation showing the relationship between a guide groove depth and a push-pull signal in a conventional push-pull method.
Figure 2A:
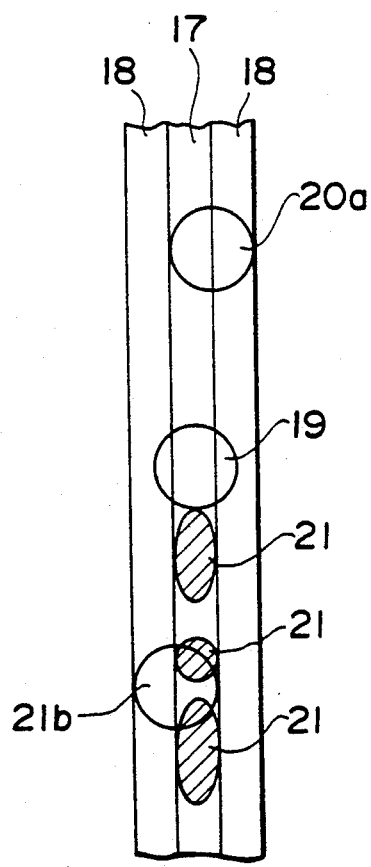
FIGS. 2A and 2B are explanatory views showing a spot position on an information recording medium in a conventional optical system.
Figure 2B:
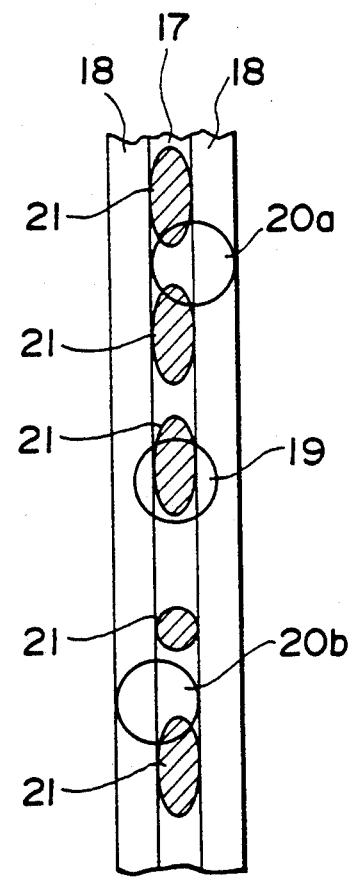
Figure 3:
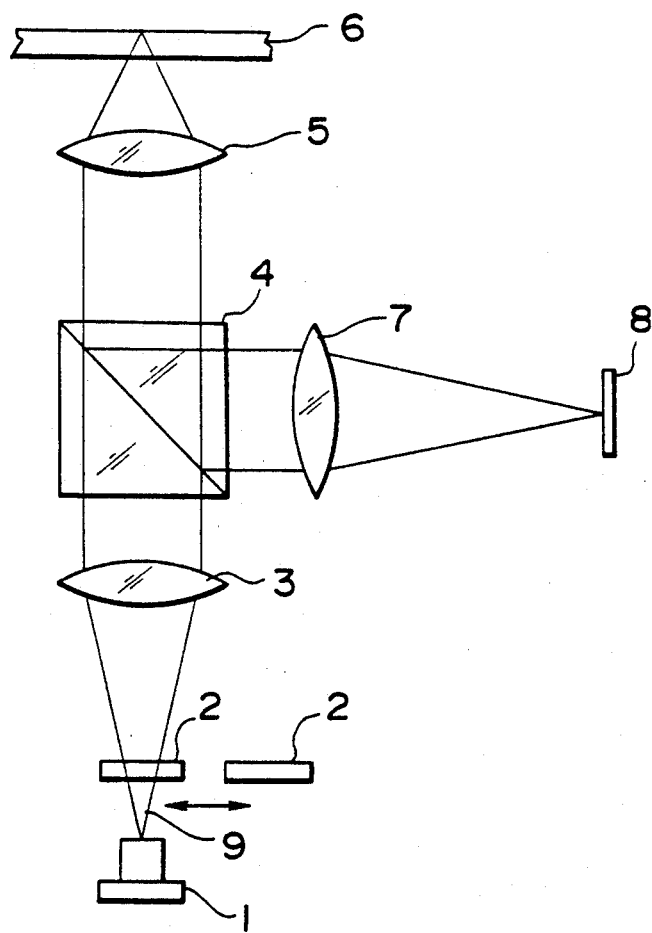
FIG. 3 is a schematic elevational view of an optical system in a conventional optical recording and reproducing apparatus.

Referring now to the drawings, wherein like reference characters designate like or corresponding parts throughout the several views and thus the repeated description thereof can be omitted for brevity, there is shown in FIGS. 8, 9, 10A and 10B the first embodiment of an optical record and reproduction apparatus according to the present invention.

Figure 8:
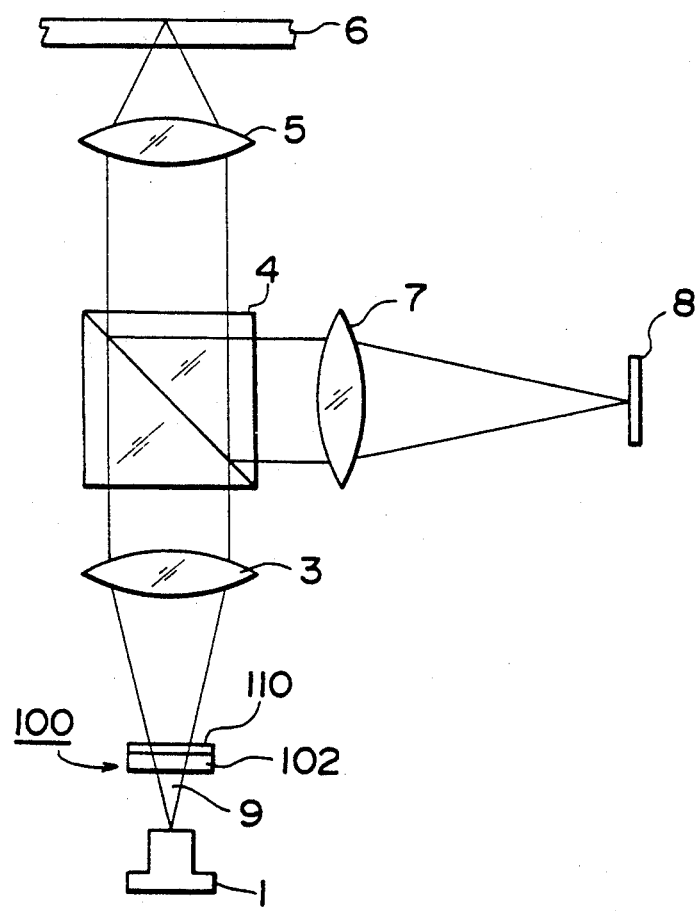
FIG. 8 is a schematic elevational view of an optical system of a first embodiment of an optical record and reproduction apparatus according to the present invention.

As shown in FIG. 8, in an optical system of an optical head device of an optical record and reproduction apparatus, a light beam is emitted by a light source such as a semiconductor laser 1, and the light beam is focused onto an information recording medium 6 through a beam divider means 100, a collimator lens 3, a beam splitter 4 and an objective lens 5. Then, the light beam is reflected by the information recording medium 6 and reaches the beam splitter 4 via the objective lens 5. The light beam is reflected by the beam splitter 4 and is then concentrated onto a light detector 8 through a condenser lens 7. The beam divider means 100 comprises a liquid crystal panel 102 and a polarizing plate 110 attached to the liquid crystal panel 102.

Figure 9:
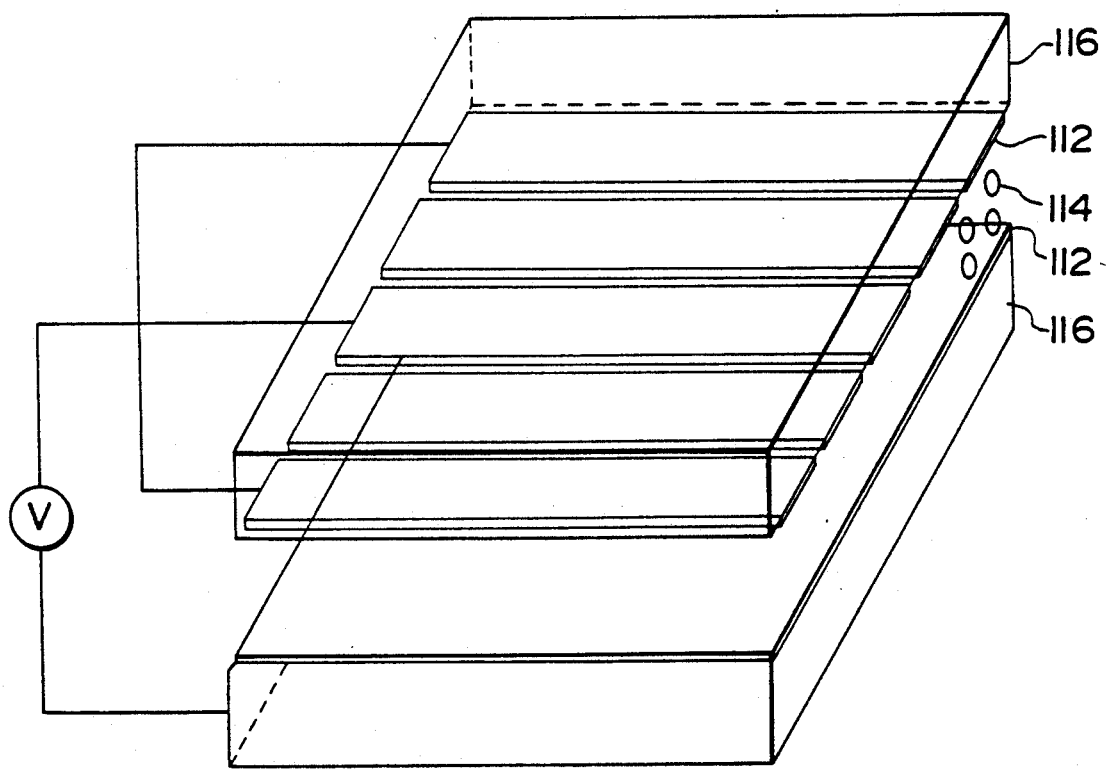
FIG. 9 is a perspective view of a liquid crystal panel of a beam divider means of the apparatus shown in FIG. 8.

In FIG. 9, there is shown one embodiment of the liquid crystal panel 102 shown in FIG. 8. A liquid crystal 114 is sandwiched by a pair of glass plates 116, and a plurality of transparent electrodes 112 having a striped form are arranged between the liquid crystal 114 and each of the glass plates 116. The width of the transparent electrode 112 is an order of several tens of $\mu$m. A voltage V is applied to every other transparent electrode 112.

Figures 10A, 10B:
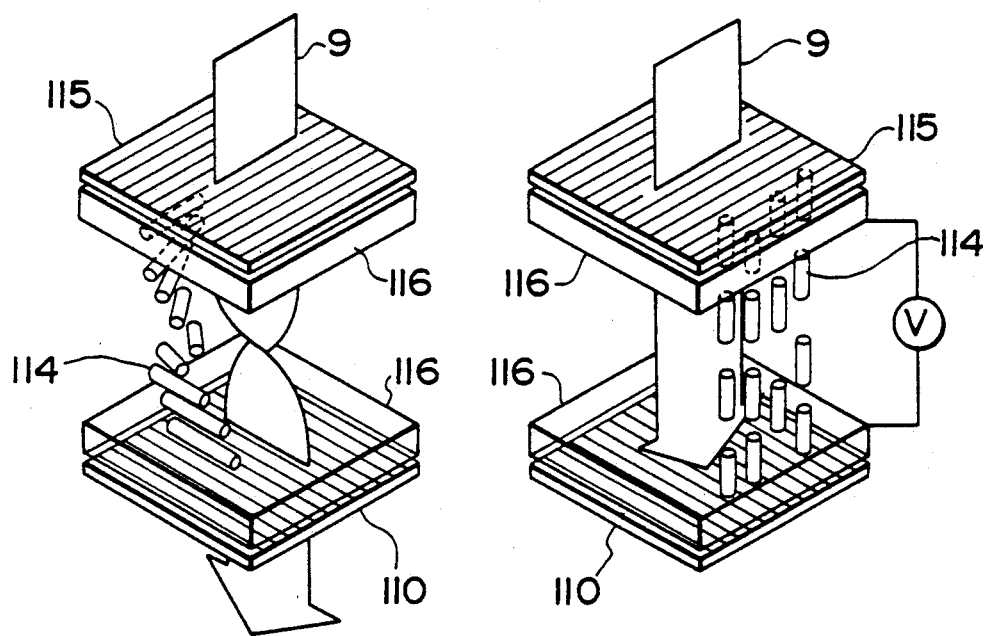
FIGS. 10A and 10B are perspective views explaining the operation of a beam divider means according to the present invention.

The principle of operation of a beam divider means having a liquid crystal panel will be described in connection with FIGS. 10A and 10B. As shown in FIGS. 10A and 10B, a liquid crystal 114 is sandwiched by a pair of upper and lower glass plates 116, and a pair of upper and lower polarizing plates 115 and 110 are further attached to the upper and lower glass plates 116 on the incoming and outgoing sides so that the polarizing axes of the polarizing plates 115 and 110 in the incoming and outgoing sides intersect each other at a right angle. In FIG. 10A, when no voltage is applied to the liquid crystal 114, a straight-linear polarized light beam 9 passing through the upper polarizing plate 115 at the incoming side rotated 90 degrees by the optical rotary power of the liquid crystal 114, and thus the polarized light beam 9 can safely pass through the lower polarizing plate 110 in the outgoing side.

On the other hand, in FIG. 10B, when a voltage V more than a threshold voltage Vth is applied to the liquid crystal 114, the optical rotary power of the liquid crystal 114 is reduced, and after passing through the upper polarizing plate 115 and the liquid crystal 114, the amount of the polarized light beam 9 passing through the lower polarizing plate 110 is reduced as the voltage applied to the liquid crystal 114 is increased. That is, the luminous energy of the light beam 9 passing through the lower polarizing plate 110 is reduced as the applied voltage is increased. By utilizing this control of the transmittance of the liquid crystal, a plurality of electrodes are aligned in one-dimensional array form to obtain a transmittance control device having a one-dimensional comb-like form. One example of the transmittance control device is shown in FIG. 9. In the above-described example, the TN (twisted Nematic) liquid crystal having an optical rotation angle of 90° as the liquid crystal 114 is used in the normally white mode. Of course a variety of liquid crystals can be used.

An operation of the beam divider means 100 of the present invention will now be described with reference to FIGS. 9, 10A and 10B.

In this embodiment, the polarizing axis of the polarizing plate 110 is so arranged on the liquid crystal panel 102 that the light beam can pass through the polarizing plate 110 after passing through the liquid crystal panel 102 when no voltage is applied to the transparent electrodes 112 arranged in striped form between the liquid crystal 114 and each of the glass plates 116, as explained above in connection with FIGS. 10A and 10B. Hence, when no voltage is applied to the transparent electrodes 112, the light beam 9 incident to the liquid crystal panel 110 completely passes through the polarizing plate 110, that is, the light beam 9 is not affected at all by the beam divider means 100. On the other hand, when a voltage more than a threshold value is applied to the transparent electrodes 112, since the voltage is applied to every other transparent electrode 112 arranged in striped form, transparent and opaque striped portions having the width of the striped form of the transparent electrodes 112 are alternately formed as would be if a diffraction grating existed, to carry out a beam dividing of the light beam 9 incident to the liquid crystal 102.

Therefore, by switching the voltage to be applied to the transparent electrode 112 so that no voltage is applied to the transparent electrodes 112 in the recording operation, and a certain voltage is applied to the transparent electrodes 112 in the reproducing operation, the tracking error signal can be obtained by the push-pull method in the recording operation or the three beam method in the reproducing operation. Although the polarizing plate 115 is arranged on the incoming side of the liquid crystal panel as shown in FIGS. 10A and 10B, since the light beam 9 emitted by the semiconductor laser 1 is a straight-linear polarized light beam, the polarizing plate 115 for obtaining a straight-linear polarized light beam is not required.

Although the width of each transparent electrode 112 is an order of several tens of $\mu$m and an ON/OFF control of every other transparent electrodes 112 is carried out by the intermittent supply of a voltage thereto to form a diffraction grating, the width of the transparent electrodes 112 can be designed smaller so as to control every transparent electrodes 112, and thus the pitch and duty of the diffraction grating can be controlled.

As described above, according to the present invention, in a liquid crystal panel, a plurality of transparent electrodes aligned in a striped form are arranged on opposite sides of a liquid crystal, and a voltage is applied to every other transparent electrode. By an ON/OFF control of the voltage applied to every other transparent electrode, the liquid crystal panel can be freely provided with a function of the diffraction grating in order to obtain a tracking error signal without any accompanying mechanical movement.

Figure 11:
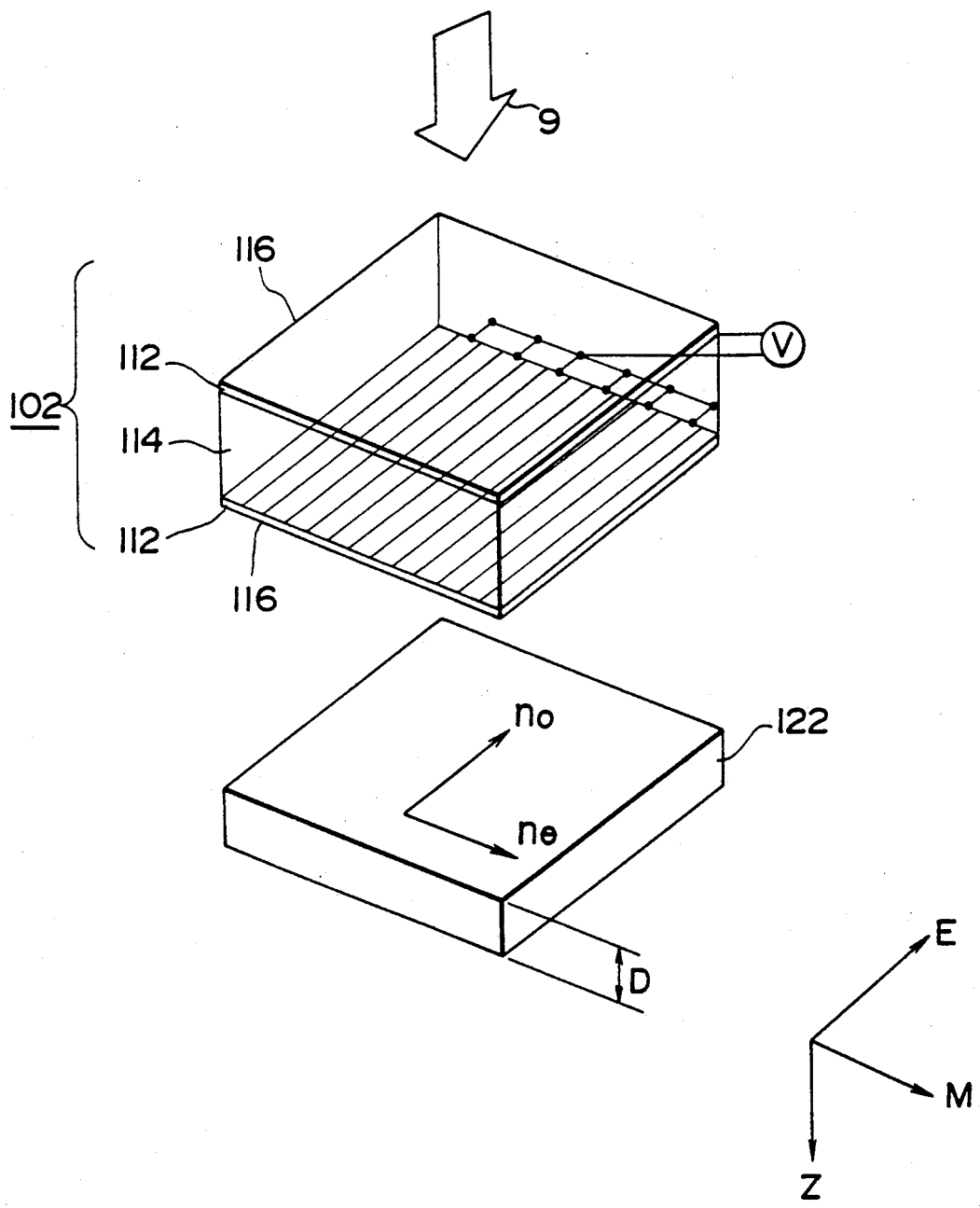
FIG. 11 is an exploded perspective view of a second embodiment of a beam divider means of an optical record and reproduction apparatus according to the present invention.

In FIG. 11, there is shown the second embodiment of a beam divider means of an optical record and reproduction apparatus according to the present invention. In this embodiment, a phase difference plate 122 instead of a polarizing plate of the first embodiment is attached to a liquid crystal panel 102 having the same structure as that shown in FIG. 9. In the liquid crystal panel 102, a plurality of transparent electrodes 112 aligned in a striped form are arranged between the liquid crystal 114 and each of the glass plates 116, and a voltage is applied to every other transparent electrode 112. As a result, the polarized light beam 9 having one polarizing direction E parallel with the aligning direction of the transparent electrodes 112 or another polarizing direction M perpendicular to the direction E can be incident to the liquid crystal panel 102.

The phase difference plate 122 comprises a uniaxial birefringent body having an anisotropic axis, for instance, different two refractive indexes No and Ne for polarizations in the respective E and M directions. By defining a thickness of the phase difference plate 122 as D, an optical path length difference D·(No−Ne) between the polarizing direction E and the polarizing direction M arises in the light beam incident to the phase difference plate 122 from the liquid crystal panel 102. Hence, relating to the phase difference plate 122, the phase difference can be appropriately given by varying the thickness D, and as a result, the phase difference plate can be used in place of a phase difference diffraction grating. For example, in order to give an optical path length difference of $1.5 \times 10^{-4}$ mm, When (No−Ne) is approximately $10^{-2}$, the thickness D can be determined to be 0.015 mm.

In this embodiment, when no voltage is applied to the transparent electrodes 112, the light beam 9 incident to the liquid crystal 102 in the polarizing direction E outgoes with its polarizing direction rotated by 90°, i.e., the polarizing direction M. Hence, the phase difference plate 122 functions as a glass plate having a refractive index Ne, and thus the light beam is not subjected to the beam dividing operation when the light beam passes through the phase difference plate 122.

On the other hand, when a voltage V more than a threshold value is applied to every other transparent electrode 112, two kinds of polarized light beams having the polarizing directions E and M are alternately aligned with a width of the transparent electrode 112 at the outgoing side of the liquid crystal panel 102, and are then passed through the phase difference plate 122, thereby dividing the light beam 9 incident to the liquid crystal panel 102 into a plurality of light beams in the same manner as with the use of the diffraction grating, as described above.

Hence, in an optical record and reproduction apparatus including this optical head device according to the present invention, switching is carried out so that no voltage is added to the transparent electrodes in the recording operation but a certain voltage is added to the same in the reproducing operation, to obtain the tracking error signal by the push-pull method in the recording operation or the three beam method in the reproducing operation.

In FIG. 12, there is shown the third embodiment of the beam divider means of an optical record and reproduction apparatus according to the present invention. In this embodiment, a couple of phase difference plates 124 and 126 instead of the phase difference plate 122 of the second embodiment is combined with a liquid crystal panel 102 having the same structure as that shown in FIG. 9. The two phase difference plates 124 and 126 each comprise a uniaxial birefringent body having an anisotropic axis and are so placed one on another that their anisotropic axes may cross each other at right angles. In this instance, assuming that the thicknesses and refractive indexes of the phase difference plates 124 and 126 are defined as A and B, and No and Ne, respectively, the optical path length difference is given by (A−B)(No−Ne), and the same effects and advantages as those obtained in the second embodiment can be obtained.

Figure 4:
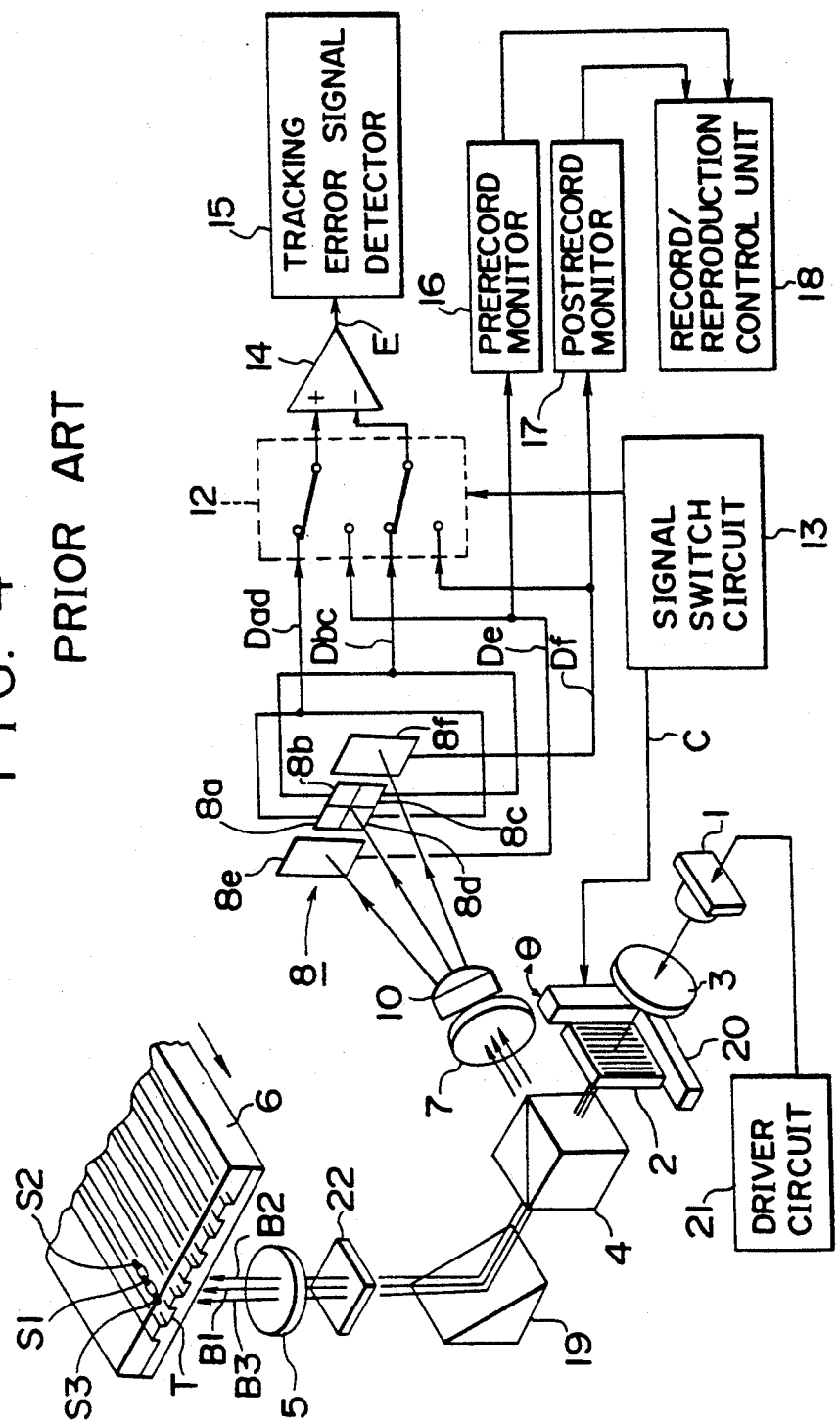
FIG. 4 is a schematic view showing a conventional optical recording and reproduction apparatus.
Figure 5:
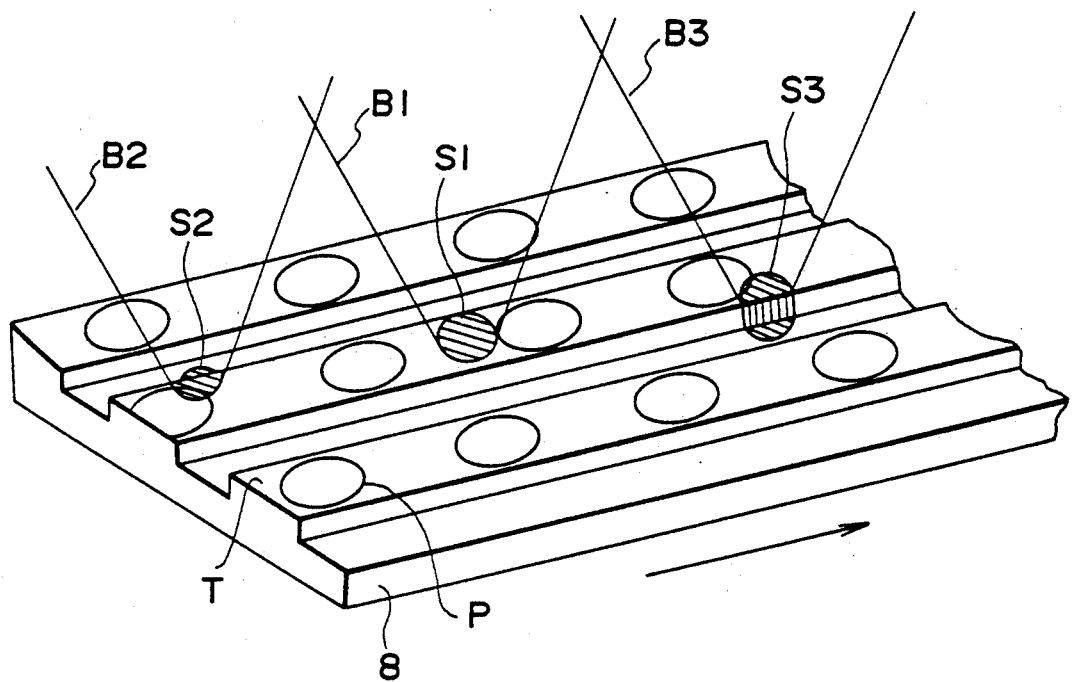
FIG. 5 is a fragmentary perspective view showing light spots positioned on an information recording medium in a reproducing operation in the apparatus shown in FIG. 4.
Figure 6:
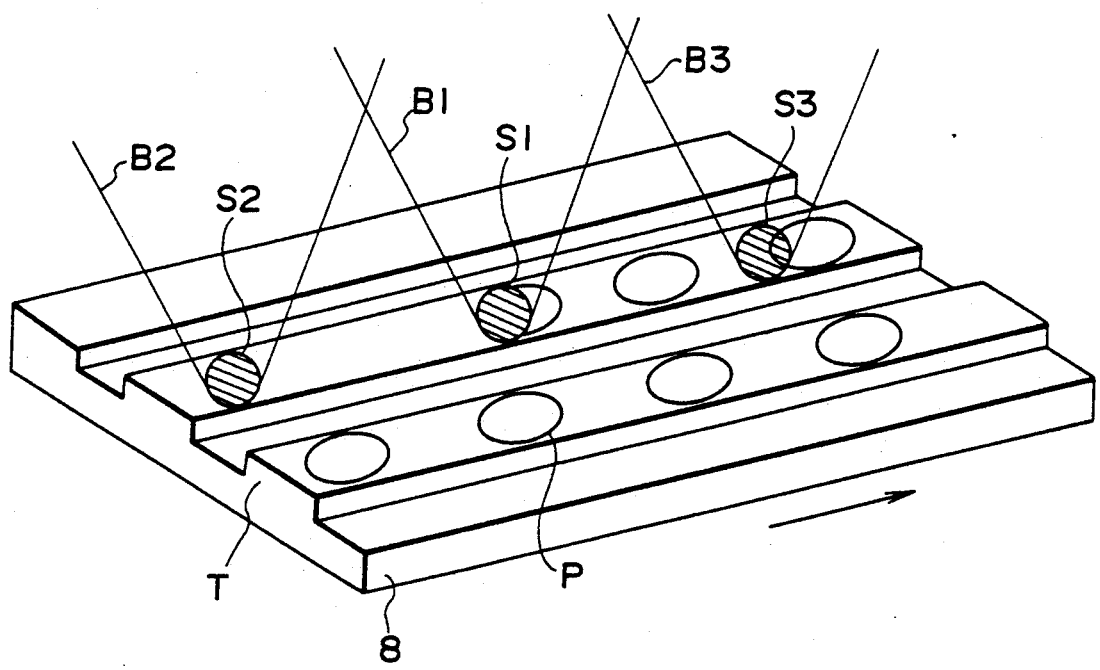
FIG. 6 is a fragmentary perspective view showing light spots positioned on an information recording medium in a recording operation in the apparatus shown in FIG. 4.
Figure 7:
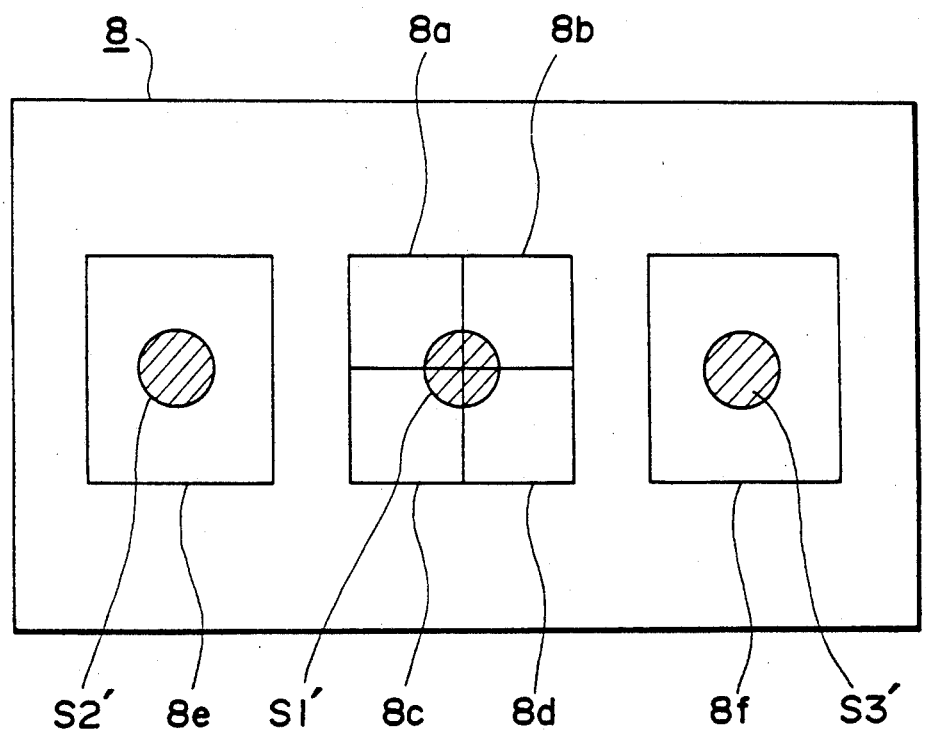
FIG. 7 is an enlarged schematic elevation showing six sensing surfaces of a light detector shown in FIG. 4.
Figure 13:
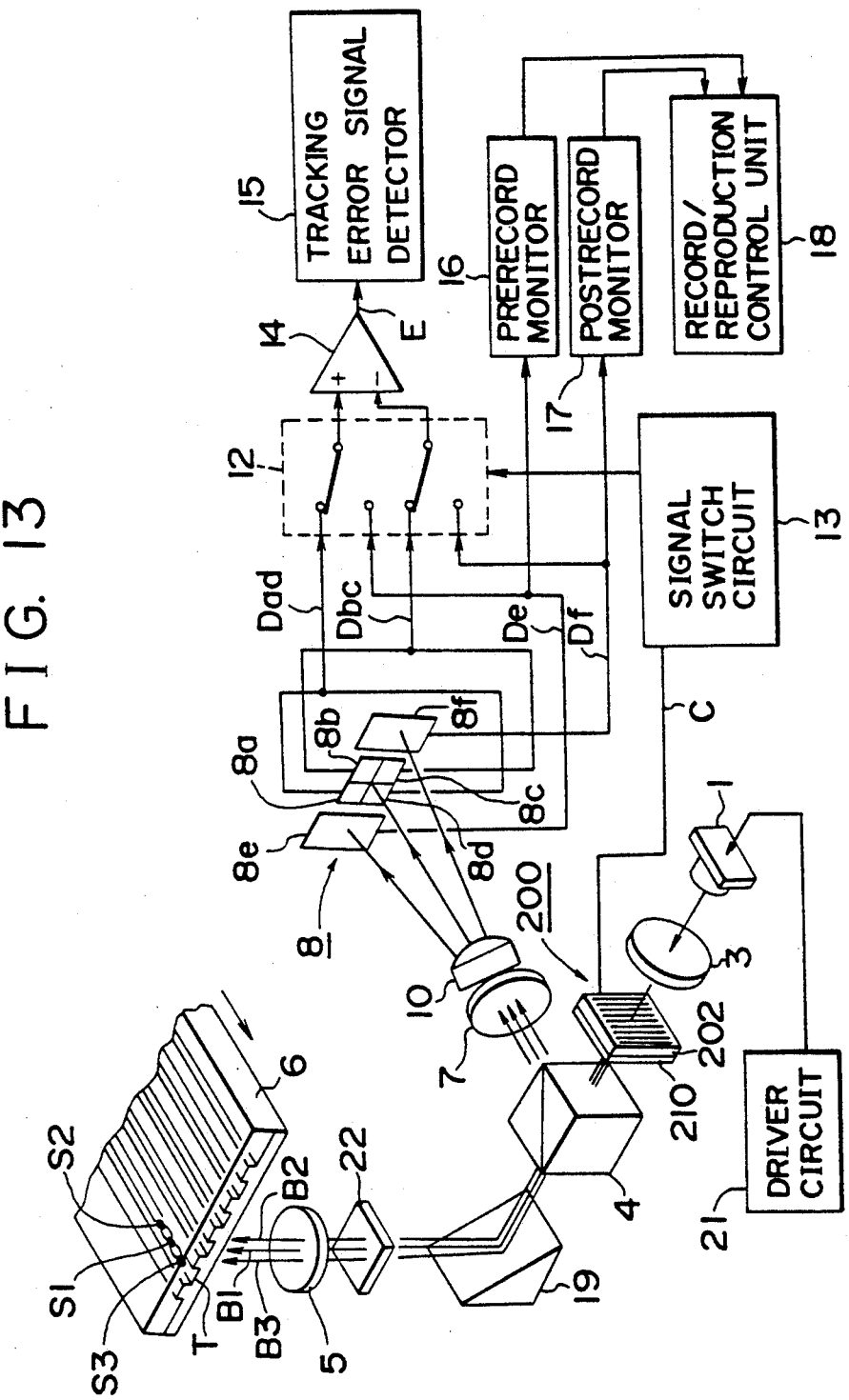
FIG. 13 is a schematic view showing a fourth embodiment of an optical record and reproduction apparatus according to the present invention.

In FIG. 13, there is shown the fourth embodiment of an optical record and reproduction apparatus according to the present invention, having a similar structure to that of a conventional optical record and reproduction apparatus shown in FIG. 4 except with a beam divider means 200 in place of a combination of a diffraction grating 2 and a slant mechanism 20 of the prior art. In this embodiment, the beam divider means 200 comprises a liquid crystal panel 202 and a polarizing plate 210 attached thereto.

Figure 14:
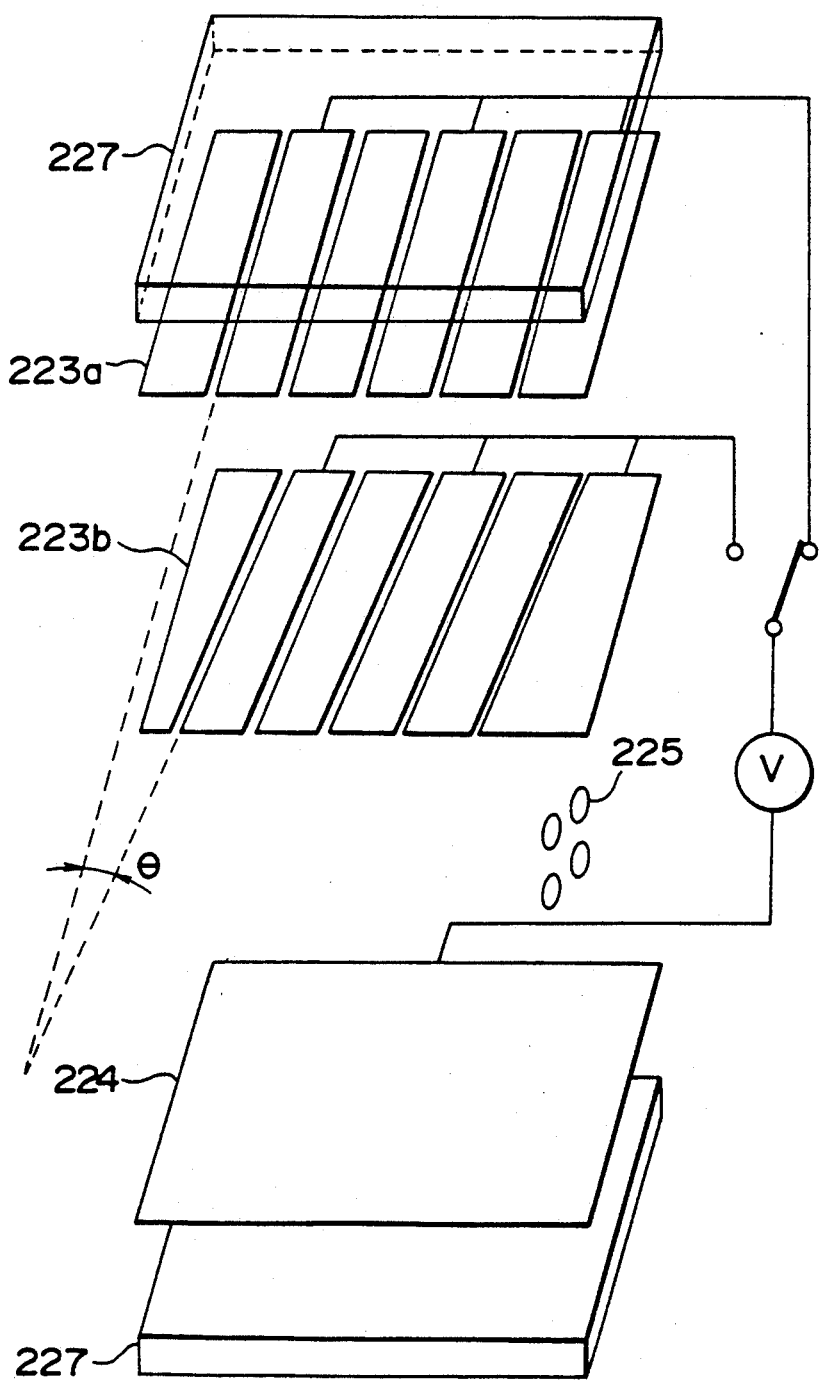
FIG. 14 is an exploded perspective view of a liquid crystal panel of a beam divider means of the apparatus shown in FIG. 13.

In FIG. 14, there is shown the liquid crystal panel 202 shown in FIG. 13. A liquid crystal 225 is sandwiched by a pair of glass plates 227. Two groups of transparent electrodes 223a and 223b aligned in a striped form are arranged between the liquid crystal 225 and each of the upper and lower glass plate 227 in the same manner as described above. The width of the transparent electrode is an order of several tens of μm, and a voltage V is applied to every other transparent electrodes in the same manner as described above. Each group of the transparent electrode 223a or 223b is formed with a predetermined angle $\theta$, that is, the transparent electrodes 223a or 223b are aligned at the inclined angel $\theta$ with respect to a direction perpendicular to the aligning direction. This angle $\theta$ is defined by lines connecting the second and third light spots S2 and S3 of the second and third light beams B2 and B3 in the recording and reproducing operations when the second and third light spots S2 and S3 are focused in the central position of the information track T in the recording operation or are focused in the positions shifted by approximately ¼ track pitch from the central position of the information track T in the reproducing operation.

The operation of the beam divider means 200 of the present invention will now be described.

When a voltage more than a threshold value is applied to the transparent electrodes 223, since the voltage is applied to every other transparent electrode 223 arranged in the striped form, transparent and opaque striped portions having the width of the striped formed transparent electrodes 223 are alternately formed as would be if a diffraction grating existed, to carry out beam dividing of the light beam incident to the liquid crystal panel 202.

The recording and reproducing operations of the optical record and reproduction apparatus shown in FIG. 13 will now be described.

In the recording operation, the signal switch circuit 13 feeds a switching signal C to the beam divider means 200 to apply a certain voltage to the transparent electrodes 223a. Since the inclination angle $\theta$ of the transparent electrodes 223a is so determined that the second and third light spots S2 and S3 of the second and third light beams B2 and B3 are irradiated in the central position of the information track T of the information recording medium 6, the second and third light spots are focused in the central position of the information track T. Hence, the intensity of the second and third light beams reflected by the information recording medium 6 is sufficient, to enable monitor signals having a high S/N ratio to be obtained from the prerecord and postrecord monitors 16 and 17 and so to improve the reliability of the defect detection operation in the record and reproduction control unit 18. At the same time, the signal switch circuit 13 controls the turning of the link switch 12 over to the position shown in FIG. 13 so as to select the signals Dad and Dbc to be supplied to the differential amplifier 14, and the tracking error signal detector 15 detects the tracking error signal E of (Dad-Dbc) in the same manner as described above.

In the reproducing operation, the signal switch circuit 13 feeds another switching signal C to the beam divider means 200 to apply a certain voltage to the transparent electrodes 223b. Since the inclination angle $\theta$ of the transparent electrodes 223b is so determined that the second and third light spots S2 and S3 of the second and third light beams B2 and B3 are irradiated in the positions shifted by approximately ¼ track pitch from the central position of the information track T of the information recording medium 6, the second and third light spots are focused in the positions shifted by approximately ¼ track pitch from the central position of the information track T. At the same time, the signal switch circuit 13 controls the turning of the link switch 12 over from the position shown in FIG. 13 to another position so as to select the signals De and Df to be supplied to the differential amplifier 14, and the tracking error signal detector 15 detects the tracking error signal E having the maximum amplitude by the three beam method in the same manner as described above.

In this embodiment, a certain voltage is selectively applied to the transparent electrodes 223a or 223b aligned in the striped form in the recording or reproducing operation, and the supplementary beams such as the second and third light beams B2 and B3 obtained by the beam divider means 200 can be used for either monitoring the information track before and after the information is recorded by the recording operation or detecting the tracking error signal E by the three beam method in the reproducing operation.

As described above, in this embodiment, the liquid crystal panel having two groups of transparent electrodes aligned in the striped form at different inclined angles $\theta$ is used as a beam divider means, and the voltage is selectively applied to one group of every other transparent electrode depending on the recording and reproducing operations to control projected position of the supplementary beams on the information recording medium. Therefore, high quality monitoring signals and a stable tracking error signal can be detected in the recording and reproducing operation of the optical record and reproduction apparatus according to the present invention without any accompanying mechanical movement.

Although the present invention has been described in its preferred embodiments with reference to the accompanying drawings, it is readily understood that the present invention is not restricted to the preferred embodiments and that various changes and modifications can be made by those skilled in the art without departing from the spirit and scope of the present invention.

What is claimed is:

1. An optical recording and reproducing apparatus, comprising:
   light source means for generating a light beam;
   means for concentrating the light beam onto an information recording medium;
   light detector means for receiving the light beam reflected by the information recording medium to obtain a tracking error signal;
   a liquid crystal panel arranged between the light source means and the concentrating means, the liquid crystal panel including a first transparent electrode having a striped form;
   a polarizing plate arranged between the liquid crystal panel and the concentrating means; and
   a voltage application means for selectively applying a voltage to the first transparent electrode such that the liquid crystal panel rotates the polarizing direction of the light beam when no voltage is applied to the first transparent electrode,
   said polarizing plate passing the polarizing directionally rotated light beam to the concentrating means when the voltage application means supplies no voltage to the first transparent electrode and blocking the non-polarizing directionally rotated light beam from the concentrating means when the voltage application means supplies voltage to the first transparent electrode.

2. The apparatus of claim 1, wherein the liquid crystal panel includes a twisted nematic liquid crystal having an optical rotation angle of 90°, and wherein a polarizing axis of the polarizing plate intersects a polarized axis of the light beam incident perpendicularly to the liquid crystal panel.

3. The apparatus of claim 1, further comprising:
   a second transparent electrode having a striped form, arranged opposite to the first transparent electrode at a predetermined angle within the liquid crystal panel; and
   switch means for selectively applying the voltage to either the first transparent electrode or the second transparent electrode.

4. The apparatus of claim 3, wherein the second transparent electrode includes a plurality of electrode members aligned in a striped form at a predetermined slant angle, and the voltage is selectively applied to every other electrode member.

5. The apparatus of claim 1, wherein the first transparent electrode includes a plurality of electrode members aligned in a striped form, and the voltage is selectively applied to every other electrode member.

6. An optical recording and reproducing apparatus, comprising:
   light source means for generating a light beam;
   means for concentrating the light beam onto an information recording medium;
   light detector means for receiving the light beam reflected by the information recording medium to obtain a tracking error signal;
   a liquid crystal panel arranged between the light source means and the concentrating means, the liquid crystal panel including a first transparent electrode having a striped form;
   a birefringent phase difference plate arranged between the liquid crystal panel and the concentrating means; and
   voltage application means for selectively applying a voltage to the first transparent electrode such that the liquid crystal panel rotates the polarizing direction of the light beam when no voltage is applied to the first transparent electrode,
   said birefringent phase difference plate passing the polarizing directionally rotated light beam to the concentrating means when the voltage application means supplies no voltage to the first transparent electrode, and blocking the non-polarizing directionally rotated light beam from the concentrating means when the voltage application means supplies voltage to the first transparent electrode.

7. The apparatus of claim 6, wherein the liquid crystal panel includes a twisted nematic liquid crystal having an optical rotation angle of 90°, and the birefringent phase difference plate comprises a uniaxial birefringent body.

8. The apparatus of claim 6, wherein the birefringent phase difference plate comprises a first uniaxial birefringent body having a first anisotropic axis and a second uniaxial birefringent having a second anisotropic axis, the first and second anisotropic axes intersecting each other in a right angle.

9. The apparatus of claim 6, further comprising:
   a second transparent electrode having a striped form, arranged opposite to the first transparent electrode at a predetermined angle within the liquid crystal panel; and
   switch means for selectively applying the voltage to either the first transparent electrode or the second transparent electrode.

10. The apparatus of claim 9, wherein the second transparent electrode includes a plurality of electrode members aligned in a striped form at a predetermined slant angle, and the voltage is selectively applied to every other electrode member.

11. The apparatus of claim 6, wherein the first transparent electrode includes a plurality of electrode members aligned in a striped form, and the voltage is selectively applied to every other electrode member.

* * * * *